United States Patent
Delaille et al.

(10) Patent No.: US 8,159,190 B2
(45) Date of Patent: Apr. 17, 2012

(54) METHOD FOR CONTROLLING THE END OF THE DISCHARGE OF A RECHARGEABLE BATTERY

(75) Inventors: Arnaud Delaille, Bassens (FR); Marion Perrin, Mery (FR)

(73) Assignee: Commissariat a l'Energie Atomique, Paris (FR)

( * ) Notice: Subject to any disclaimer, the term of this patent is extended or adjusted under 35 U.S.C. 154(b) by 488 days.

(21) Appl. No.: 12/310,683

(22) PCT Filed: Oct. 5, 2007

(86) PCT No.: PCT/FR2007/001635
§ 371 (c)(1),
(2), (4) Date: Mar. 4, 2009

(87) PCT Pub. No.: WO2008/046980
PCT Pub. Date: Apr. 24, 2008

(65) Prior Publication Data
US 2009/0278502 A1    Nov. 12, 2009

(30) Foreign Application Priority Data
Oct. 13, 2006    (FR) ..................... 06 08986

(51) Int. Cl.
*H02J 7/00*    (2006.01)
(52) U.S. Cl. ............. 320/136; 320/132; 324/427
(58) Field of Classification Search ............. 320/136
See application file for complete search history.

(56) References Cited

U.S. PATENT DOCUMENTS

| | | | |
|---|---|---|---|
| 6,172,483 B1 * | 1/2001 | Champlin | 320/134 |
| 6,191,590 B1 | 2/2001 | Klütz et al. | |
| 2003/0204328 A1 | 10/2003 | Tinnemeyer | |
| 2004/0170091 A1 * | 9/2004 | Schep et al. | 369/44.13 |
| 2007/0090843 A1 | 4/2007 | De Doncker et al. | |

FOREIGN PATENT DOCUMENTS

| | | |
|---|---|---|
| DE | 197 25 204 C1 | 4/1999 |
| WO | WO 99/66340 A1 | 12/1999 |
| WO | WO 2005/031380 A1 | 4/2005 |

OTHER PUBLICATIONS

Hammouche et al., "Monitoring state-of-charge of Ni-MH and Ni-Cd batteries using impedance spectroscopy," *Journal of Power Sources*, vol. 127, 2004, pp. 105-111.

Blanke et al., "Impedance measurements on lead-acid batteries for state-of-charge, state-of-health and cranking capability prognosis in electric and hybrid electric vehicles," *Journal of Power Sources*, vol. 144, 2005, pp. 418-425.

* cited by examiner

*Primary Examiner* — Arun Williams
(74) *Attorney, Agent, or Firm* — Oliff & Berridge, PLC

(57) ABSTRACT

The method for controlling the end of discharge of a rechargeable battery according to the invention comprises determining the transition frequency of the battery and determining an end-of-discharge criterion of the battery according to said transition frequency. Said end-of-discharge criterion is representative for example of a predetermined maximum value of the slope of the transition frequency. The transition frequency can be determined periodically during use of the battery, discharging being interrupted by regulating means according to said transition frequency.

8 Claims, 4 Drawing Sheets

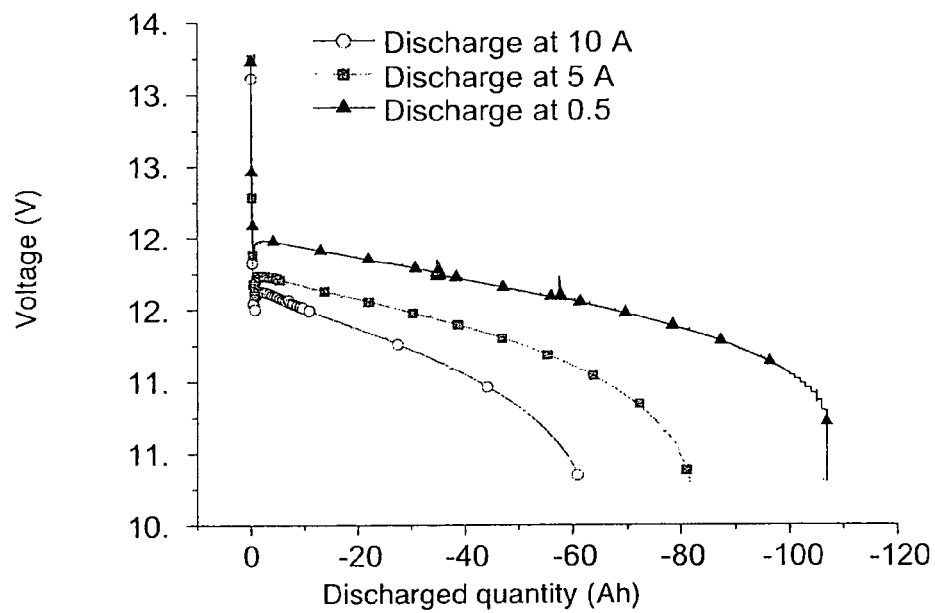
FIG. 1 (state of the art)
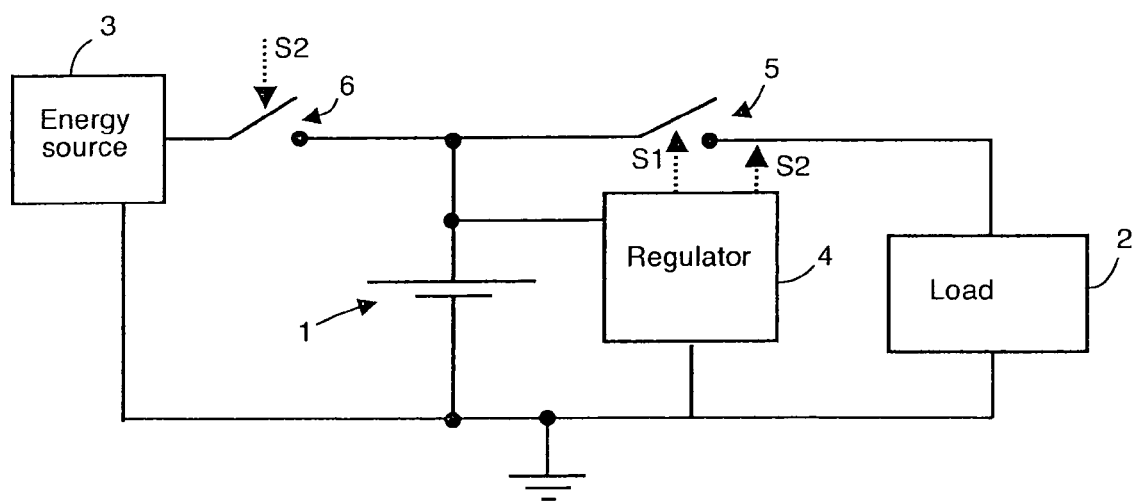
FIG. 2 (state of the art)

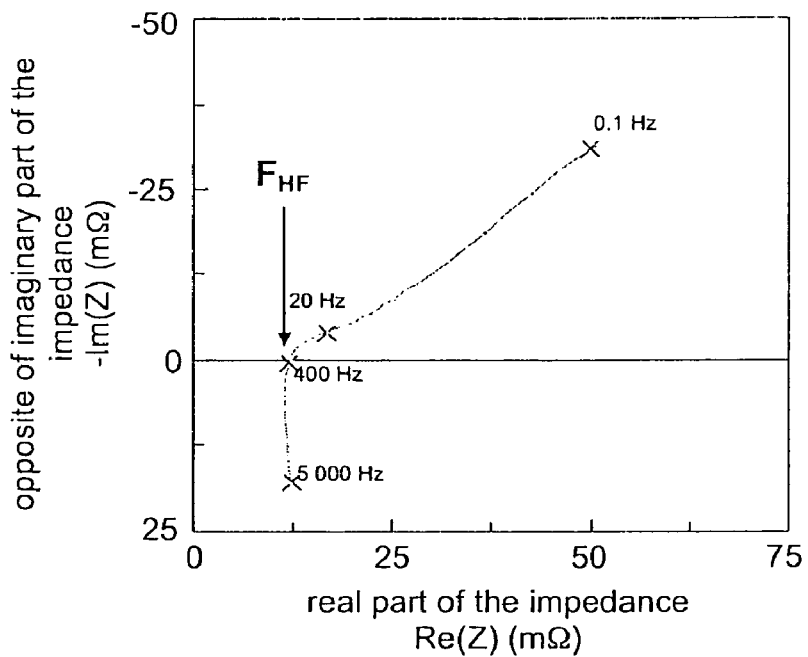
FIG. 4 (state of the art)
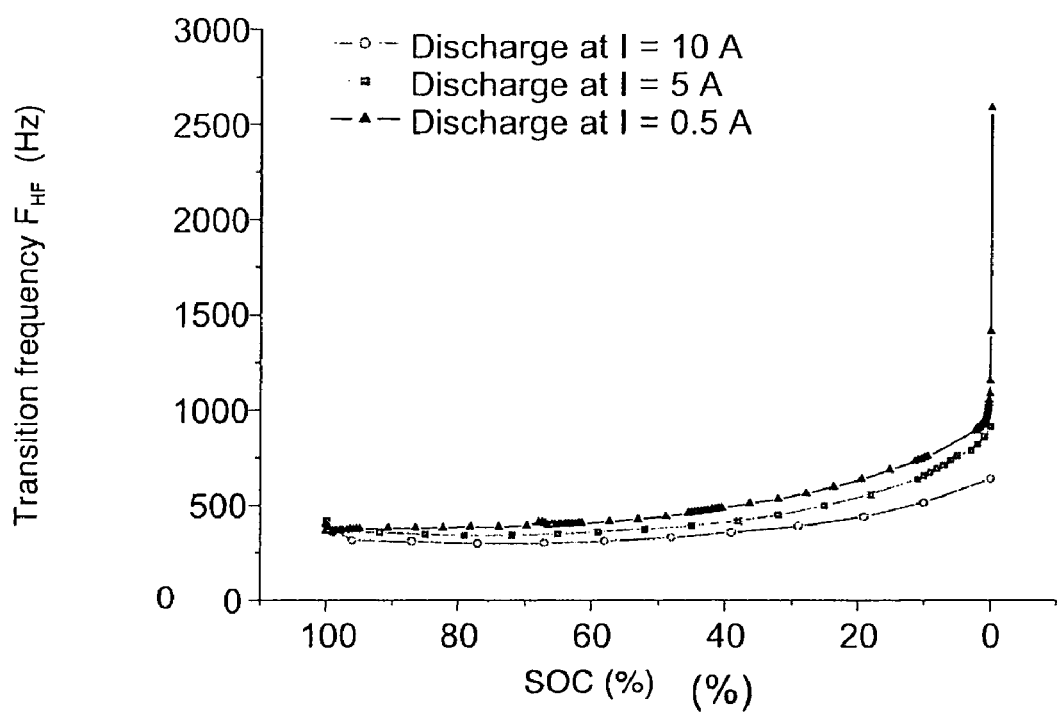
FIG. 5 (state of the art)

METHOD FOR CONTROLLING THE END OF THE DISCHARGE OF A RECHARGEABLE BATTERY

BACKGROUND OF THE INVENTION

The invention relates to a method for controlling the end of discharge of a rechargeable battery.

STATE OF THE ART

Electrochemical storage cells, or rechargeable batteries, are used in numerous mobile applications of the portable electronic type, thermal, electric or hybrid vehicles, etc...., or in numerous stationary applications of the telecommunication relay type or production of electricity from intermittent energy sources, such as wind or photovoltaic power, etc...., ensuring in all cases an element as paramount as it is fragile.

To optimize their lifetime in these different applications, rechargeable batteries generally have to be protected against any in-depth discharge, which would most of the time be synonymous with premature degradation, or even in certain cases with impossibility of recharging. In all applications in which rechargeable batteries are liable to reach in-depth discharge states, Low Voltage Disconnect (LVD) thresholds are therefore used to stop discharging.

For example, as represented on the graph of FIG. 1 illustrating the voltage versus the discharged quantity of the battery for three discharges performed in three different current regimes, i.e. 0.5 A (curve plot with triangles), 5 A (curve plot with squares) and 10 A (curve plot with dots), the voltage decreases in conventional manner to reach the value of 10.8V corresponding to the LVD threshold described above, a value at which discharging must be stopped.

Once this voltage threshold has been reached, the battery is therefore disconnected. It should however be noted that the voltage of the disconnected battery then immediately increases, due to cancelling of voltage surges imposed by the current. If no precautions are taken, discharging can therefore again be authorized before being immediately interrupted, resumption of discharging meaning that the LVD threshold has again been reached. To avoid this type of micro-discharges at low charge states, which are as detrimental for the battery as they are for the electronics performing disconnection and reconnection of the battery, a new Low Voltage Reconnect (LVR) threshold is then used. Resumption of discharging on this new voltage criterion does not however ensure that the battery has been recharged in the meantime to allow a new discharging, so that this method in fact only tones down the detrimental effect of micro-discharges without preventing it completely.

Moreover, optimal adjustment of these voltage thresholds is very delicate. Although these voltage thresholds take account of the technology of the battery or of the dimensioning of the system, they are nevertheless kept constant throughout operation of the battery. But the voltage of a battery depends both on its technology, and also on its operating conditions, i.e. the charging or discharging current, the relaxation period, the temperature, and finally its state of health, or state of wear.

In the case of a battery able to comprise series connection of elements, an inhomogeneity between the elements can itself have an incidence on the voltage measured at the terminals of the whole battery. In other words, there is no direct relation, or at least only an approximate relation, between the voltage of a battery and its state of charge. The voltage criteria used at the present time are therefore not capable of fully appreciating the depth of discharge of rechargeable batteries integrating all the contributions described above. Depending on the operating conditions or ageing conditions, these voltage thresholds therefore tend not to be ideal, and may even in certain cases lead premature degradation of the battery. Furthermore, the values of the cut-off thresholds for different discharge regimes are determined, when development of a new series of batteries takes place, by very empirical, numerous, long and therefore costly measurements.

A conventional control structure of a battery 1 is represented schematically in FIG. 2. In conventional manner, a battery 1 supplies a load 2 for example via a power source 3. The charging and discharging cycles of battery 1 are controlled by a regulator 4 connected to the terminals of battery 1 and measuring for example the voltage at the terminals of battery 1. Regulator 4 controls charging of battery 1 according to S1 via a first switch 5 designed in particular to disconnect the battery after discharging, and controls power source 3 according to S2 via a second switch 6. To prevent damage such as described above, the voltage thresholds used to stop discharging are very greatly over-evaluated in such a regulator described above, so as to make sure never to descend below the really critical state of charge threshold.

For example, in the case of lead-acid batteries used in photovoltaic systems, the low voltage threshold of these batteries is generally close to 1.9V/cell (i.e. 11.4V for a battery with 6 cells), whatever the conditions of wear or operation of the batteries. But lead-acid batteries could most of the time be used up to a threshold close to 1.8V/cell (i.e. 10.8V for a battery with 6 cells), without any detrimental consequences for their use. This results in a lack of storage energy that may reach around 10% of the capacity of the battery. Control of end of discharge of such rechargeable batteries is therefore not optimal.

OBJECT OF THE INVENTION

The object of the invention consists in providing a method for controlling the end of discharge of a rechargeable battery that is efficient, simple to achieve from the use of data specific to complex impedance measurements, and that enables a diagnostic of the state of the batteries to be made, while at the same time taking account of the impact of the past and present conditions of use and of the state of health of the batteries, and that enables any untimely reconnections of the fully discharged batteries to be avoided.

The method according to the invention is characterized in that it comprises determining the transition frequency of the battery and determining an end-of-discharge criterion of the battery according to said transition frequency.

According to a particular embodiment of the invention, the transition frequency is determined periodically during use of the battery, discharging being interrupted by regulating means according to said transition frequency.

According to an alternative embodiment of the invention, said end-of-discharge criterion is determined from measurements of the transition frequency made during a calibration phase.

According to another alternative embodiment of the invention, said end-of-discharge criterion is readjusted from measurements of the transition frequency made during a maintenance phase.

According to developments of the invention, said end-of-discharge criterion is representative of a sudden change of slope of the transition frequency in the course of discharging, of a predetermined maximal value of the transition frequency or of a predetermined maximal value of the slope of the transition frequency.

BRIEF DESCRIPTION OF THE DRAWINGS

Other advantages and features will become more clearly apparent from the following description of particular embodiments of the invention given for non-restrictive example purposes only and represented in the accompanying drawings, in which:

FIG. 1 is a graph representing the discharged quantity of a battery versus the voltage, respectively in three different current regimes (0.5 A, 5 A and 10 A), according to the prior art.

FIG. 2 schematically represents a conventional structure for controlling a rechargeable battery according to the prior art.

FIG. 4 illustrates identification of the transition frequency $F_{HF}$ in a Nyquist diagram, according to the prior art.

FIG. 5 is a graph representing the state of charge SOC of a battery versus the transition frequency $F_{HF}$, respectively in the three different current regimes according to FIG. 1.

DESCRIPTION OF A PREFERRED EMBODIMENT OF THE INVENTION

Figure 3:
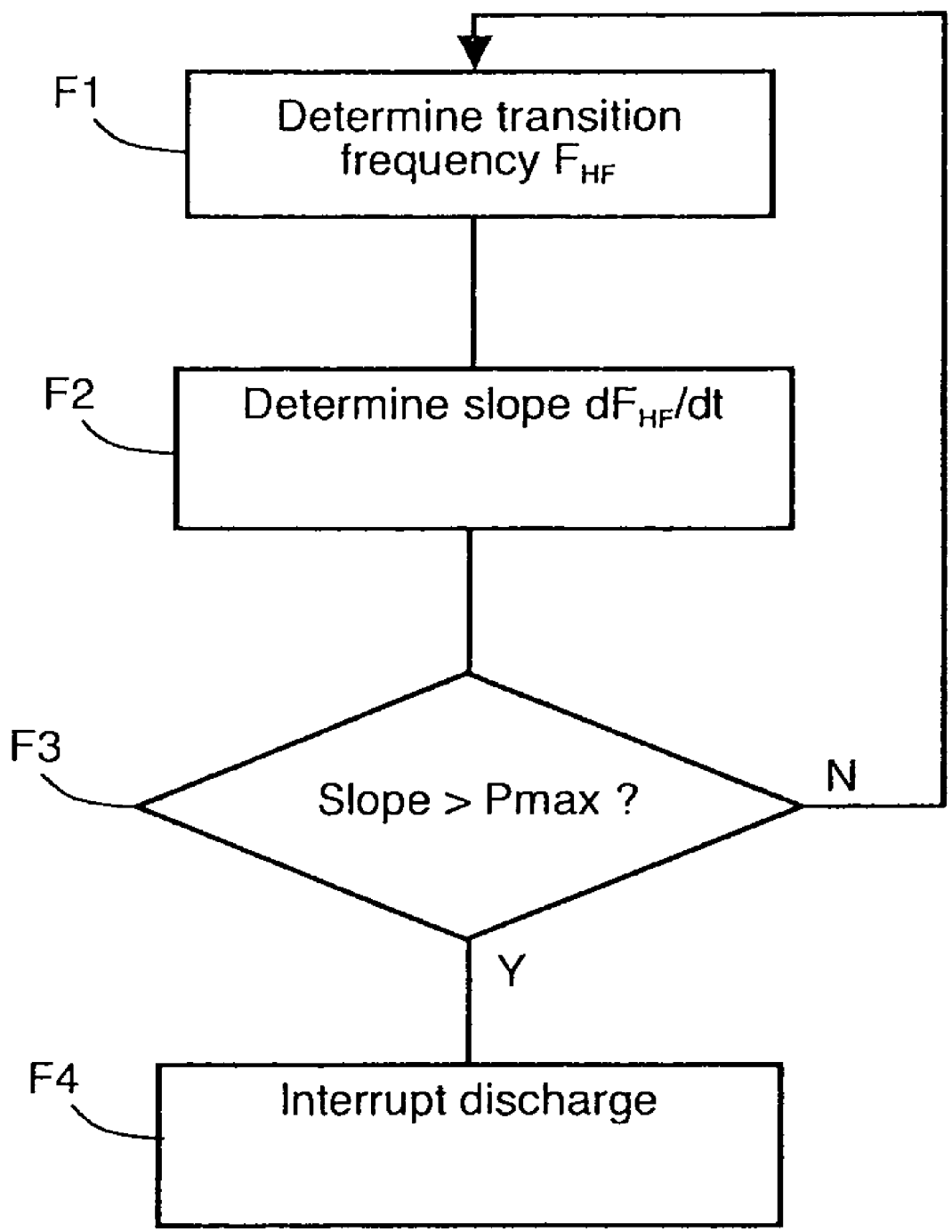
FIG. 3 represents, in flowchart form, a particular embodiment of a method for controlling the end of discharge of a rechargeable battery according to the invention.

With reference to FIG. 3, the method for controlling end of discharge of a rechargeable battery according to the invention can be achieved by a conventional control structure, as represented in FIG. 2, with a regulator enabling charging and discharging of the battery to be controlled, for example by control on switches.

In the particular embodiment represented in FIG. 3, the method for controlling the end of discharge of a rechargeable battery consists in a first step F1 in determining the transition frequency $F_{HF}$ of the battery.

For example, determining the transition frequency $F_{HF}$ can be done by dichotomy. Considering for example a lead-acid battery with a transition frequency $F_{HF}$ in a range of frequencies from 3300 Hz to 100 Hz, and considering the imaginary part of the impedance measured at the frequency f, noted Im(Z(f)), and considering s the sign of this quantity, we can then write: if $s<0$, then $F_{HF}>f$ and if $s\geq 0$, then $F_{HF}\leq f$.

The principle of the dichotomy then consists in making a first measurement, for example at f1=1700 Hz, corresponding to the central point of the frequency range mentioned above. According to the sign of Im(Z(f1)) and the above relation, a new measurement will then be made, for example at f2=2500 Hz, if s was smaller than 0, or at f2'=900 Hz if s was larger than 0. According to the sign of Im(Z(f2)), or respectively Im(Z(f2')), a new measurement will then be made, for example at f3=2900 Hz if s was smaller than 0, or at f3'=2100 Hz if s was larger than 0, or respectively at f3=1300 Hz if s was smaller than 0, or at f3'=500 Hz if s was larger than 0, and so on.

In a general manner, each new measurement can in fact be defined by the relation: fn+1=fn+x if $s<0$ and fn+1=fn−x if $s>0$, with $x=|f_n-f_{n-1}|/2$. From the 3300 Hz-100 Hz range, seven measurements then suffice to obtain $F_{HF}$ at 25 Hz, which expresses a precision that is quite reasonable and sufficient.

Moreover, an estimation of the determination time of transition frequency $F_{HF}$ by this method can be obtained by considering the making of these seven successive measurements, all made at frequencies of more than 100 Hz. Considering that the measurements are moreover made on five periods for each frequency studied, only thirty-five measurements then have to be made and this takes much less than half a second, i.e. 0.35 s if all the measurements are made at 100 Hz. This method by dichotomy thereby enables monitoring of the transition frequency $F_{HF}$ to be performed at each second, or on a longer time step.

In the field of impedance measurements, it was already known to determine the transition frequency $F_{HF}$. As represented in FIG. 4 illustrating identification of transition frequency $F_{HF}$ in a Nyquist diagram, the transition frequency $F_{HF}$ conventionally corresponds to the frequency at which the complex impedance of the battery switches from an inductive behavior to a resistive behavior, or to the frequency at which the imaginary part of the complex impedance is cancelled out. This involves an impedance parameter measured in high frequencies, in continuous manner during operation of the battery, whether the latter be at rest or in operation, in totally non-intrusive manner.

However, not all known present-day impedance measuring apparatuses use this value of the transition frequency $F_{HF}$, but use the impedance values measured at various frequencies for diagnosis of the state of health of batteries. This is the case in particular of the document US 2003/204328, which describes an apparatus using a method for determining the state of health of a battery by measuring impedance values at various frequencies. Several recent publications, in particular the article "Monitoring state-of-charge of Ni-MH and Ni—Cd batteries using impedance spectroscopy" by A. Hammouche et al. (Journal of Power Sources, vol-127, 2004, pp. 105-11) and the article "Impedance measurements on lead-acid batteries for state-of-charge, state-of-health and cranking capability prognosis in electric and hybrid electric vehicles" by H. Blanke et al. (Journal of Power Sources, vol-144, 2005, pp. 418-425), and also the document WO 2005/031380, also show the possibility of monitoring the state of charge of nickel-cadmium batteries, or of lead-acid batteries, from this transition frequency $F_{HF}$. For example, as represented in FIG. 5, it is thus possible to determine the transition frequency $F_{HF}$ according to the state of charge (SOC) of the battery, for the same three different current regimes of FIG. 1, i.e. 0.5 A, 5 A and 10 A.

However no document or no known apparatus makes allusion to the possible use of the transition frequency $F_{HF}$ in the scope of a regulation system, nor in controlling the end of discharge of batteries on the basis of this criterion. The method according to the invention for its part proposes to use this transition frequency $F_{HF}$, in order to control the end of discharge of a rechargeable battery, transition frequency $F_{HF}$ being related to the state of the active material and being usable to stop discharging according to the real state of the active material.

In FIG. 3, after step F1 of determining transition frequency $F_{HF}$, the method for controlling comprises determining the slope of transition frequency $F_{HF}$, in a second step F2. The slope is determined by the derivative of transition frequency $dF_{HF}/dt$.

The derivative of transition frequency $dF_{HF}/dt$ can in particular be determined from the graph of FIG. 5. Indeed, this graph illustrates the transition frequency $F_{HF}$ according to the state of charge SOC, when discharging takes place at constant current I. The state of charge SOC is however proportional to current I multiplied by time t. In FIG. 5, current I being constant, the state of charge SOC is proportional to time t. The derivative of each of the three curve plots represented in FIG. 5 therefore corresponds to the slope of transition frequency $dF_{HF}/dt$, give or take a constant which is the discharge current I.

Then in a third step F3, the method for controlling consists in comparing the previously computed slope with a predetermined maximal value Pmax representative of the end-of-discharge criterion of the battery from which the battery has to be disconnected. If the computed value of the slope is lower than the predetermined maximal value Pmax, the method for controlling loops back to before step F1 of determining transition-frequency $F_{HF}$. If the computed value of the slope is greater than the predetermined maximal value Pmax, the method for controlling then goes on to the next step F4, i.e. interrupting discharge of the battery, by means of a regulator (FIG. 2). The predetermined maximal value Pmax thereby defines the end-of-discharge criterion, which is a function of the transition frequency, from which the battery has to be disconnected.

Figure 6:
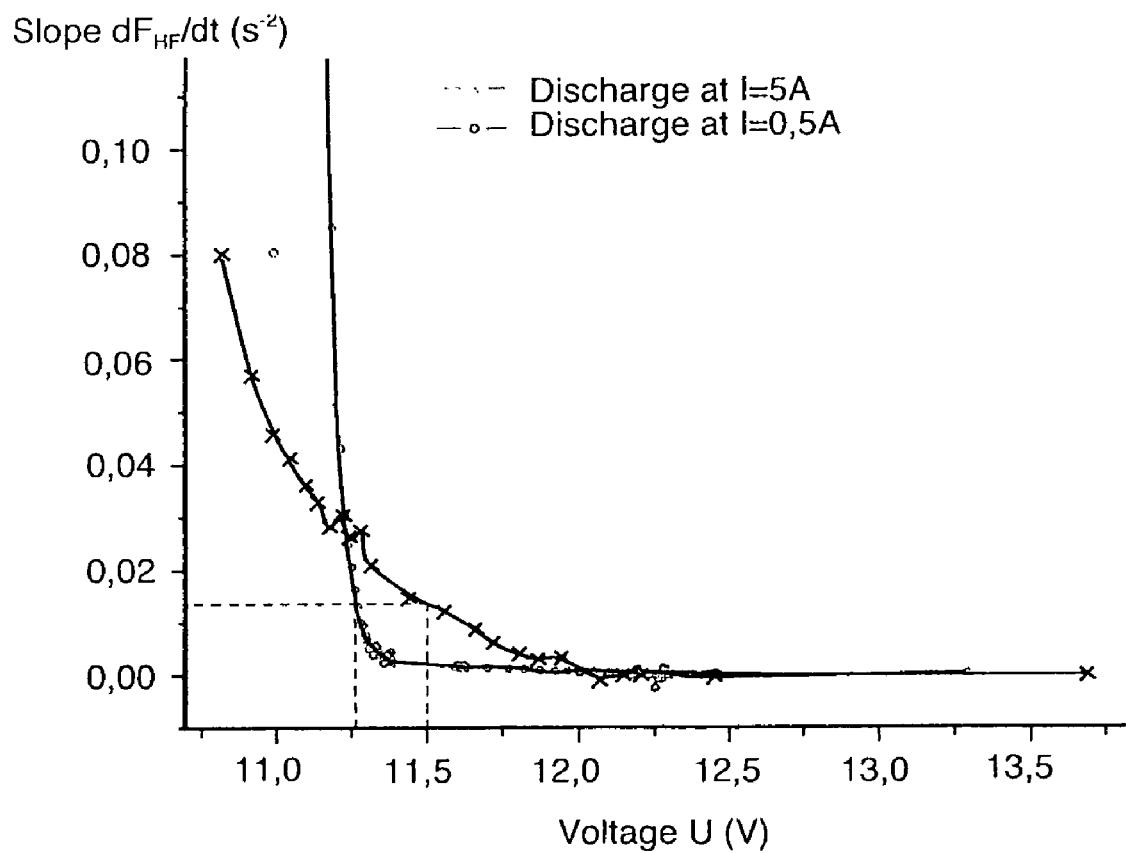
FIG. 6 is a graph illustrating the slope of the transition frequency according to the voltage, respectively in different current regimes (0.5 A and 5 A), according to the invention.

For example, considering the graph represented in FIG. 6 which illustrates the value of the slope $dF_{HF}/dt$ of transition frequency $F_{HF}$ according to the voltage U at two different current regimes, i.e. 0.5 A (curve plot with dots) and 5 A (curve plot with crosses), it is apparent that use of the slope $dF_{HF}/dt$ of transition frequency $F_{HF}$ can prove to be perfectly convincing for the purposes of preserving the dependability of the end-of-discharge setpoint during ageing of the battery.

In the case of photovoltaic applications, it is in fact commonplace to stop discharging on a fixed voltage stop setpoint, of about 11.5V, whatever the discharging conditions. For example, stopping discharging on a threshold of 11.5V at 5 A (broken line in FIG. 6), which corresponds to a slope $dF_{HF}/dt$ of transition frequency $F_{HF}$ of about 0.015, leads to keeping the same slope value $dF_{HF}/dt$ of transition frequency $F_{HF}$ to stop discharging at a threshold of about 11.25V at 0.5 A.

In the embodiment described above, the transition frequency is determined (F1), for example periodically during use of the battery in operation, discharging then being interrupted (F4) by the regulator (FIG. 2) according to the computed transition frequency (F1).

In another alternative embodiment, not represented, the end-of-discharge criterion applied to the method for controlling can be determined from measurements of transition frequency $F_{HF}$ made during a calibration phase of the battery. The end-of-discharge criterion corresponding to calibration is then entered in the regulator (FIG. 2). The method then consists, as before, in determining the transition frequency $F_{HF}$ (F1) and for example the slope (F2), the battery being disconnected (F4) when the end-of-discharge criterion computed during calibration is reached (F3) during operation of the battery.

In another alternative embodiment, not represented, the end-of-discharge criterion can also be readjusted from measurements of the transition frequency $F_{HF}$ made during a maintenance phase of the battery. As before, computation of the transition frequency $F_{HF}$ and of the corresponding end-of-discharge criterion is then performed during this maintenance phase and the battery is disconnected when the end-of-discharge criterion is reached during operation of the battery.

Furthermore, whether it be during a calibration phase or during a maintenance phase, the end-of-discharge criterion computed according to the transition frequency $F_{HF}$ and enabling disconnection of the battery is preferably constituted by the voltage at the battery terminals measured by the regulator (FIG. 2), thus defining a fixed voltage stop setpoint (FIG. 6).

In another alternative embodiment, not represented, of a method for controlling the end of discharge of a rechargeable battery, the battery end-of-discharge criterion can be representative of a sudden change of slope of the transition frequency $F_{HF}$ in the course of discharging. The sudden change of slope is defined by the second derivative of the transition frequency $dF_{HF}^2/dt^2$ and the method for controlling then consists in using this computed value of the second derivative as the value representative of the end-of-discharge criterion, the battery being disconnected by means of the regulator (FIG. 2) when this criterion is reached.

In another alternative embodiment, the battery end-of-discharge criterion can be representative of a predetermined maximal value of the transition frequency $F_{HF}$. As before, the method for controlling then consists in determining the transition frequency $F_{HF}$ and in comparing the value obtained with the predetermined maximal value. If this computed value is lower than the predetermined maximal value, then the method loops back to before the step F1 of determining the transition frequency $F_{HF}$ and a new transition frequency $F_{HF}$ is measured. If the computed value is higher than the predetermined maximal value, then the end-of-discharge criterion has been reached and the regulator interrupts discharging by disconnecting the battery.

Whatever the embodiment described above, such a method for controlling is therefore very efficient and simple to perform, while at the same time enabling a diagnosis of the state of discharge of the batteries to be made and taking account of the impact of the past and present conditions of use and the state of health of the batteries. Such a method also enables any untimely reconnections of the fully discharged batteries to be prevented. Control of discharging of a battery is therefore optimal and operation of the rechargeable battery, and its lifetime, are therefore optimized.

Due to the use of such an end-of-discharge criterion according to the different embodiments of the method for controlling described above, the invention applies in particular to definition and development of a new series of products, to easy and inexpensive determining of the end-of-discharge thresholds and to indication thereof to the users, for all discharge regimes.

The invention also applies to direct use in a regulator of a new end-of-discharge criterion for adjustment of the end of discharge of the battery so that the end of discharge takes account of the state of the battery as far as ageing or past use are concerned.

The invention also applies to use, in a system comprising a battery and its regulator, of the new end-of-discharge criterion so as to recalibrate the thresholds of said regulator when maintenance operations are performed.

The invention is not limited to the different embodiments described above. The term battery used in the above description in particular encompasses both rechargeable batteries and rechargeable electrochemical storage cells. The method for controlling described above applies in particular to any type of rechargeable batteries.

In a general manner, all types of charge or discharge can be used, taking account of the type of battery and/or of the type of application in which this battery is used.

The invention claimed is:

1. A method for controlling an end of discharge of a rechargeable battery, the method comprising:
   determining a transition frequency of the battery,
   determining a first or a second derivative of the transition frequency with respect to time, and
   determining a first parameter by means of said first or second derivative of the transition frequency.

2. The method according to claim 1, further comprising comparing the first parameter to an end-of-discharge criterion and disconnecting the battery according to a result of the comparison.

3. The method according to claim 2, further comprising performing a calibration phase of the battery and determining the end-of-discharge criterion from measurements of the transition frequency performed during the calibration phase.

4. The method according to claim 2, further comprising performing a maintenance phase of the battery and modifying the end-of-discharge criterion from measurements of the transition frequency performed during the maintenance phase.

5. The method according to claim 2, wherein said end-of-discharge criterion is representative of a predetermined maximal value of the slope of the transition frequency.

6. The method according to claim 2, wherein said end-of-discharge criterion is representative of a sudden change of slope of the transition frequency in the course of discharging.

7. The method according to claim 1, further comprising comparing the first parameter to a parameter of the battery and disconnecting the battery according to a result of the comparison.

8. The method according to claim 7, wherein the first parameter is a voltage which is a function of the first or second derivative of the transition frequency, the first parameter being compared with a voltage at the battery terminals.

* * * * *